March 28, 1961  E. P. WENZELBERGER  2,977,234
METHOD OF CONCENTRATING FRUIT JUICES
Filed Nov. 15, 1954

INVENTOR
ELWOOD P. WENZELBERGER

BY
ATTORNEYS

United States Patent Office 2,977,234
Patented Mar. 28, 1961

2,977,234
METHOD OF CONCENTRATING FRUIT JUICES

Elwood P. Wenzelberger, Dayton, Ohio, assignor, by mesne assignments, to Union Carbide Corporation, New York, N.Y., a corporation of New York Filed Nov. 15, 1954, Ser. No. 468,752

2 Claims. (Cl. 99—205)

This invention relates to concentration of liquids by freezing, more particularly to a method and apparatus for extracting juices from ice.

It is well known that various liquids can be concentrated by suitable freezing processes. Specifically, several processes for the concentration of fruit juices by freezing have been proposed. These processes usually involve the freezing of the juice or other liquid in steps. In each step a portion of the water in the juice is removed in the form of ice. The partially concentrated juice is removed from the system and the remainder which comprises juice and ice is conveyed to the next freezing step.

The juices are invariably extracted from the slushy mass of ice and juice by means of centrifugal force. When the ice which represents the water removed from the juice has been separated from the slushy mass introduced into the centrifuge, the ice is then disposed of in some convenient manner.

It has been found both through calculations and experience that if a greater percentage of juice could be extracted from the ice after each freezing step, the overall efficiency of the freezing process would be considerably increased. It is recognized that the liquids and solids which constitute a juice are both entrained within the ice and adhere to the surfaces of the ice crystals. While the problem of removing liquids from ice is present in all processes wherein it is desired to concentrate the liquids by freezing, this problem is more apparent in the concentration of fruit juices. As the field of producing concentrated juices is highly competitive, there is a constant stimulus to increase the efficiency and lower the cost of the concentration processes employed. One manner whereby the efficiency may be increased and the cost lowered is by eliminating the possibility of any juice being conveyed with the ice which is removed from the centrifuge after each freezing process. Since, as pointed out above, the juice not only adheres to the ice but is also entrained within the ice crystals, it can be seen that an effort shoud be made to break down these ice crystals.

The present invention discloses both a method and apparatus which results in virtually removing all the juice adhering to and entrained in the ice. The process disclosed as this invention essentially comprises the introduction of heated gases during the rotation of the centrifuge and simultaneously applying a vacuum for withdrawing the vapors from the centrifuge. A suitable pump is used to draw off these vapors and the vapors are passed through a condenser which removes any matter which has been carried off by the vapors.

As the introduction of the heated gases serves to melt the ice adhering to the basket of the centrifuge, the apparatus and method disclosed as this invention also eliminates the need for a scraper. Consequently, the undue accumulation of ice on the basket walls is prevented and less power is necessary in order to operate the centrifuge.

During the centrifuging process, most of the extracted juice and any ice water intermixed therewith is drained and conveyed to the next freezing step. The remainder of the juice and intermixed ice water is drawn through the condenser which again removes juices carried by the vapor and these removed juices are then conveyed to the juice drained from the centrifuge.

It is, therefore, the principal object of this invention to provide an improved method of removing liquids from ice.

It is another object of this invention to increase the efficiency in the removal of juice or the like from ice by centrifugal force.

It is a further object of this invention to provide a method of removing virtually all of the juices entrained in ice and adhering to the surface of the ice.

It is still another object of this invention to provide a novel form of centrifuge apparatus which eliminates the need for scrapers to remove the accumulation of ice on the walls of a centrifuge basket.

It is a still further object of this invention to provide an improvement in the centrifuge apparatus which eliminates the need for actively disposing of the separated ice.

Other objects and advantages of this invention will become apparent from the following description when taken in conjunction with the accompanying drawings wherein.

Returning now to the drawings, more particularly to Figure 1, wherein like reference symbols indicate the same parts throughout the various views, 10 indicates generally the centrifuge apparatus constructed in accordance with the teachings of this invention.

Figure 1:
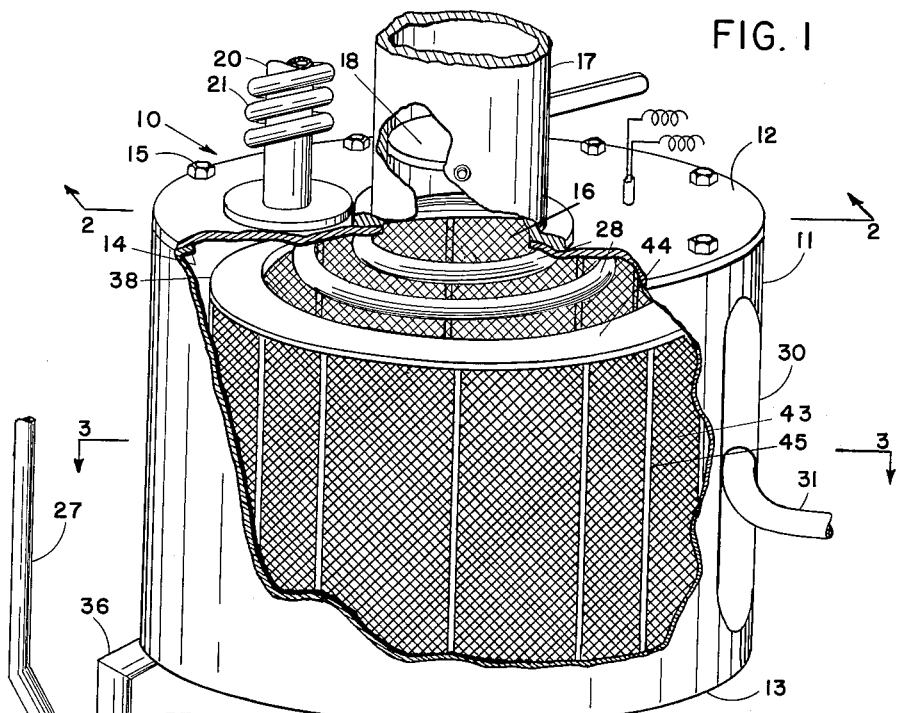
Figure 1 is an over-all perspective view of the centrifuge apparatus of this invention with a portion of the casing removed.
Figure 2:
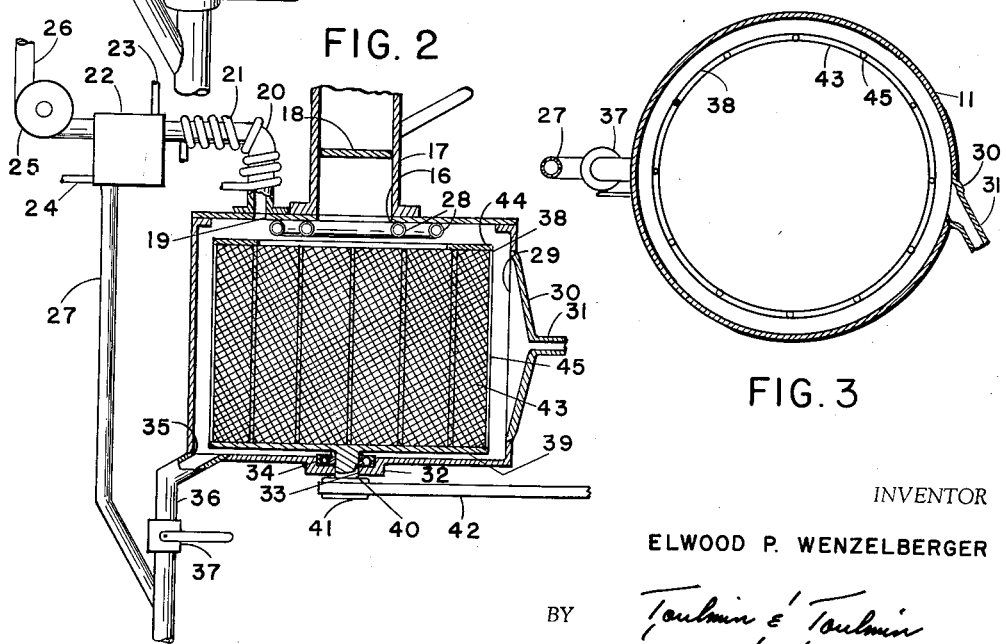
Figure 2 is a sectional view taken along the lines 2—2 of Figure 1 to show the interior of the centrifuge and also to show the apparatus associated with the centrifuge.
Figure 3:
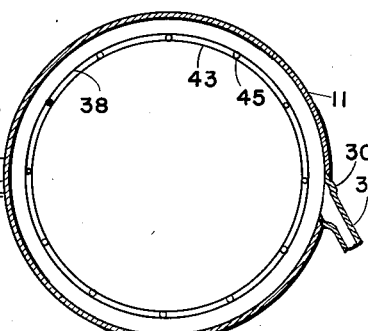
Figure 3 is a sectional view taken along the line 3—3 of Figure 1.

The centrifuge 10 comprises a cylindrical side wall 11 enclosed at one end by a top wall 12, and at the other end by a bottom wall 13.

The top wall 12 is secured to an internal flange 14 of the side wall 11 by means of a plurality of bolts 15. There is a centrally located opening 16 in the top wall 12. A suitable conduit 17 is connected to that portion of the top wall surrounding the opening 16. The conduit 17 is for the purpose of conveying the slushy mass of ice and juice to the centrifuge 10. A plate dump valve 18 is located within the conduit 17. The plate dump valve 18 is preferably automatically operated by a suitable circuit. However, if desired, the valve may be manually operated.

There is a smaller opening 19 in the top wall 12 and there is connected to the opening 19 a vacuum line 20. It is preferable that cooling coils 21 surround the vacuum line 20. The vacuum line 20 is connected to a suitable condenser 22. A coolant is circulated through the condenser 22 by being introduced through the intake line 23 and removed through the outlet line 24. The vacuum line 20 extends from the other side of the condenser 22 and is connected to a vacuum pump 25. The vacuum pump 25 has an exhaust line 26. There is a drain conduit 27 leading from the condenser 22 which serves to remove the condensate therefrom.

If desired, suitable sterilizing lamps 28 may be mounted from the top wall 12 with electrical leads passing therethrough, in order to sterilize the contents of the centrifuge during the operation thereof.

The side wall 11 has a longitudinally extending slot 29 therein. Connected to the slot 29 is a substantially V-shaped duct 30. The duct 30 has a virtually constant thickness and is so attached to the side wall 11 so as to be substantially tangential thereto. At the apex of the duct 30, there is attached a suitable conduit 31 through which hot gases are introduced into the duct and subsequently into the centrifuge.

The bottom wall 13 of the centrifuge 10 is secured to the cylindrical side wall 11 in any suitable manner. Located centrally of the bottom wall 13 is a circular boss 32 in the center of which is an opening 33. Recessed within the boss 32 is a bearing 34.

The bottom wall 13 has a drain opening 35 to which is suitably connected a drain line 36. A drain valve 37 is located within the drain line 36. The valve 37 may be either automatically or manually operated. The drain conduit 27 leading from the condenser 22 is connected to the drain line 36 at a point below the drain valve 37.

Rotatably mounted within the centrifuge 10 is a basket 38. The basket 38 has a bottom surface 39 which may or may not be solid. Extending downwardly from the bottom surface 39 is a shaft 40 which is rotatably journalled in the bearing 34 and extends through the opening 33. A pulley 41 is secured to the end of the shaft 40 and is drivingly connected by means of a V-belt 42 to a suitable source of power.

The basket 38 has a perforated side wall 43 which may be made of a suitable wire mesh. There is a top rim 44 in the shape of an annulus which is connected to the bottom surface 39 by means of a plurality of vertically extending rods 45. The side wall 43 is fastened to the top rim, the bottom surface and vertically extending rods 45 to constitute the centrifuge basket 38.

With the construction of this invention in mind, the operation of the described apparatus will now be explained. As pointed out above, freezing is invariably conducted in steps. At the end of each freezing step a slushy mass of ice and juice is removed from the freezing tank. This slushy mass is conveyed through the conduit 17 into the centrifuge tank. The centrifuge is set into operation by rotating the basket. The centrifugal force applied to the mass of ice and juice will cause the juice to be thrown outwardly against the side walls of the centrifuge. The ice will be retained against the wire mesh wall of the basket.

During this rotation of the basket a suitable heated gas such as hot air is introduced into the centrifuge through the duct 30. This heated gas tends to melt, and subsequently vaporize, all of the ice clinging to the walls of the basket. Concurrently with the introduction of the heated gases, the vacuum pump 25 is operated to apply a vacuum to the centrifuge tank. Volatile material within the centrifuge 10, including the vaporized ice, is drawn through the vacuum line 20 into the condenser 22. Various sugars which may be carried in the vapors are extracted from the vapors by condensation. These extracted sugars are then conveyed through the drain conduit 27.

As the juice is being extracted from this slushy mass due to the rotation of the basket, the juice and any liquids intermixed therewith passes through the drain line 36. These liquids intermixed with the juice will comprise water from the melted ice which did not vaporize. This liquid intermixed with the juice will be a relatively small portion as a considerable amount of the ice will be vaporized and drawn off by the vacuum line. By opening the drain valve 37 the liquids drawn from the centrifuge will join the condensate from the condenser 22 and this liquid is then transported to the next freezing tank.

It is pointed out that the heated gases are introduced tangentially to the centrifuge 10. This results in a rotary movement of the gases and enables the gases to circulate about the basket and to come in contact with all portions of the basket side wall.

It is pointed out that other means may be used to melt the ice accumulating on the side wall of the basket. This means may consist of heating coils positioned around the side wall of the centrifuge. This would eliminate the necessity for introducing heated gases into the centrifuge. However, a vacuum would still be applied to the centrifuge in order to draw off vapors formed by the evaporation of the ice.

It is pointed out that all of the ice introduced into the centrifuge is changed into either a vapor or a liquid. As means are provided for the removal of both the vapor and the liquid, it can be seen that there is no need for any active removal of the ice from the centrifuge. This greatly simplifies the construction of the centrifuge.

With the apparatus and its method of operation in mind it can be readily seen that this invention has several distinct advantages over the prior art. As a result of this invention it is now possible to remove entrained sugars or juices which are both in and on the ice. In addition, this invention eliminates the use of a scraper to remove the accumulation of ice from the basket, eliminates the necessity for disposing of the ice separated from the slushy mass, and keeps the juice entirely sterile. As pointed out in the description of this apparatus, suitable sterilizing lamps may be mounted inside the casing of the centrifuge.

It should be borne in mind that while the apparatus and the method of this invention has been described in connection with the concentration of fruit juices this apparatus is not limited to this use. It is possible to use the disclosed apparatus and method in the concentration of virtually any liquid by freezing. These multitudinous uses are possible because the concentration of liquids basically involves removing the water therefrom in the form of ice. The slushy mass of ice and liquid resulting from each freezing step may then be readily handled by the apparatus disclosed as this invention.

It will be understood that this invention is susceptible to modification in order to adapt it to different usages and conditions, and, accordingly, it is desired to comprehend such modifications within this invention as may fall within the scope of the appended claims.

What is claimed is—

1. In a method of concentrating fruit juices wherein the ice is being continuously separated from the liquid concentrate without discharging the separated ice, the steps of partially freezing a fruit juice into a slushy mass of liquid concentrate and ice, separating the ice from the liquid concentrate by centrifugal force in a centrifuge, removing the liquid concentrate from the centrifuge but retaining the separated ice in the centrifuge, melting the retained separated ice in the centrifuge to release at least a portion of the solids occluded therein and to vaporize the liquid formed by the melted ice, condensing the vaporized liquid to remove therefrom any solids constituting the fruit juice and entrained in said vapors, and combining the evaporated residue and the solids regained from the vapors with the liquid concentrate.

2. In a method of concentrating fruit juices wherein the ice is being continuously separated from the liquid concentrate without discharging the separated ice therefrom, the steps of partially freezing the fruit juice into a slushy mass of liquid concentrate and ice, separating the ice from the liquid concentrate by centrifugal force in a centrifuge, removing the liquid concentrate from the centrifuge but retaining the separated ice within the centrifuge adjacent the outer surface thereof, directing a stream of hot air at the retained separated ice in the centrifuge to melt the ice to release at least a portion of the solids occluded therein and to vaporize the liquid formed by the melting ice, withdrawing the vaporized liquid from the centrifuge, condensing the vaporized liquid to remove therefrom any solids constituting the fruit juice and entrained in said vapors, and combining the condensate resulting from the condensed vaporized liquids and the solids regained from the vapors with the liquid concentrate to obtain a fruit juice of a desired concentration.

(References on following page)

References Cited in the file of this patent

UNITED STATES PATENTS

| | | |
|---|---|---|
| 2,167,881 | Eberts et al. | Aug. 1, 1939 |
| 2,301,901 | McKinnis | Nov. 10, 1942 |
| 2,354,633 | Bedford | July 25, 1944 |
| 2,435,023 | Van Riel | Jan. 27, 1948 |
| 2,436,218 | Malcolm | Feb. 17, 1948 |
| 2,450,774 | Zahm | Oct. 5, 1948 |
| 2,588,337 | Sperti | Mar. 11, 1952 |
| 2,657,555 | Wenzelberger | Nov. 3, 1953 |

FOREIGN PATENTS

| | | |
|---|---|---|
| 96 | Great Britain | Jan. 8, 1883 |
| 4,430 | Great Britain | Mar. 24, 1887 |
| 50,989 | Germany | Feb. 26, 1890 |